No. 637,073. Patented Nov. 14, 1899.
A. BORDEN.
THERMOSTATICALLY ACTUATING VALVE MECHANISM AND ALARM.
(Application filed Feb. 9, 1899.)
(No Model.)
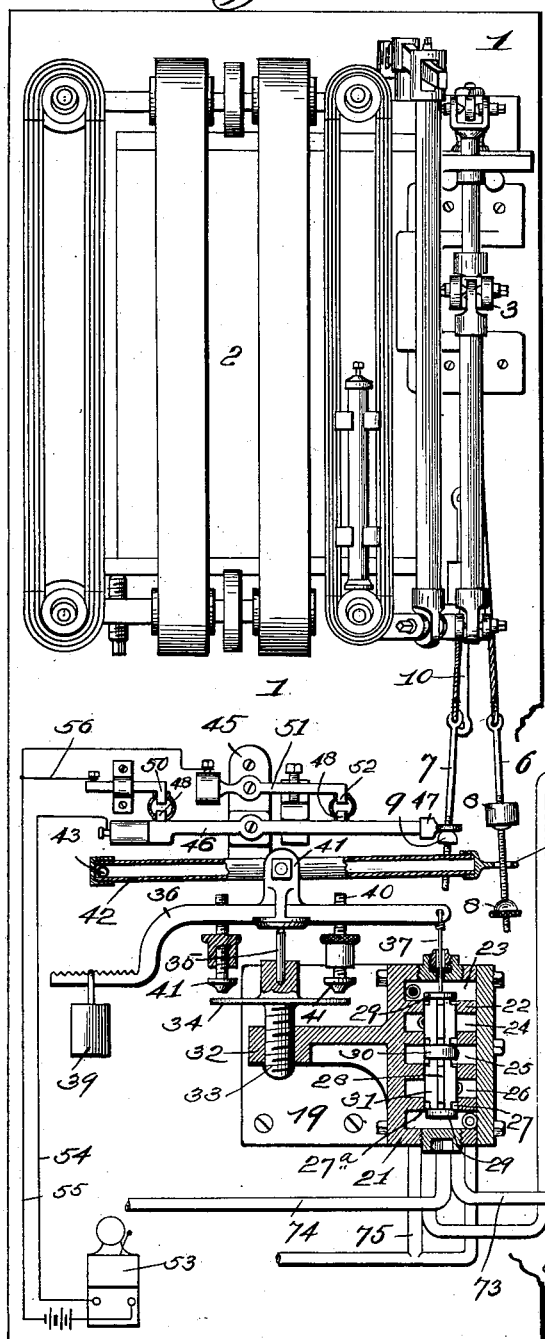
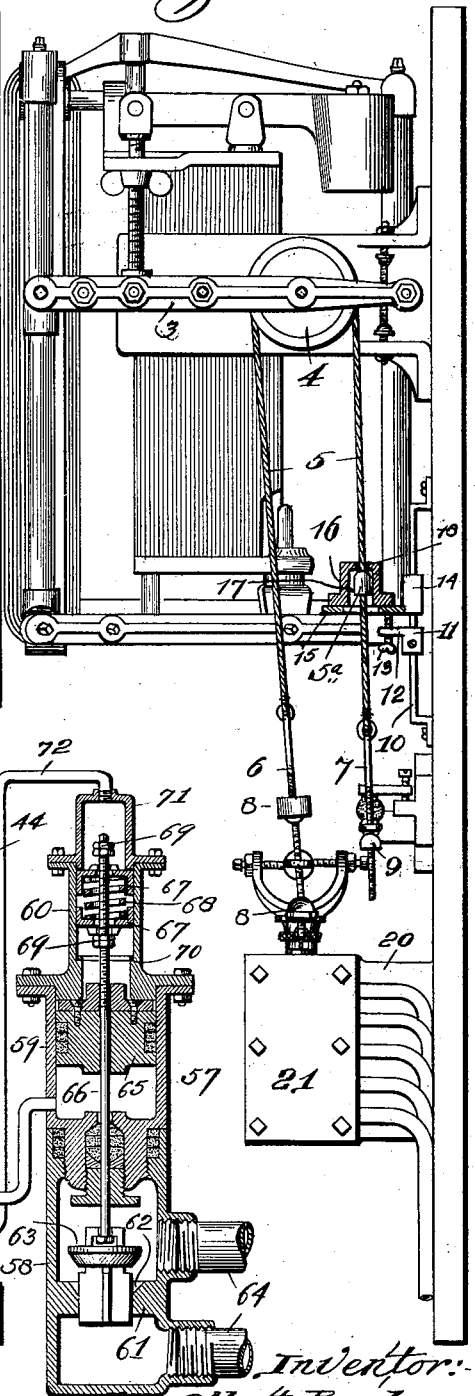

UNITED STATES PATENT OFFICE.

ALBERT BORDEN, OF ST. LOUIS, MISSOURI.

THERMOSTATICALLY-ACTUATING VALVE MECHANISM AND ALARM.

SPECIFICATION forming part of Letters Patent No. 637,073, dated November 14, 1899.

Application filed February 9, 1899. Serial No. 705,138. (No model.)

*To all whom it may concern:*

Be it known that I, ALBERT BORDEN, of the city of St. Louis, State of Missouri, have invented certain new and useful Improvements in Thermostatically-Actuating Valve-Operating Mechanism and Alarms, of which the following is a full, clear, and exact description, reference being had to the accompanying drawings, forming a part hereof.

My invention relates to thermostatically-actuating valve-operating mechanism and alarms; and it consists of the novel construction, combination, and arrangement of parts hereinafter shown, described, and claimed.

Figure 1 is a front elevation of my improved thermostatically-actuating valve-operating mechanism and alarm. Fig. 2 is a side elevation thereof.

Referring by numerals to the accompanying drawings, 1 indicates a suitable base upon which the thermostat and actuating device and the alarm are located, the valve being located at any desired point or distance from said thermostat, actuating device, and alarm. Upon the face and upper end of the base 1 is located a suitable thermostat 2, which thermostat is preferably of that construction in which the motion resulting from the variation of temperature is utilized to operate a fulcrumed lever 3, at one end of which is rotatably arranged a grooved wheel or pulley 4, over which operates a flexible cable 5. The ends of this cable 5 extend downwardly a short distance below the thermostat 2, and to said ends are secured in any suitable manner the rods 6 and 7, the lower ends of which are screw-threaded, and upon the screw-threaded portion of the rod 6 is arranged a pair of nuts 8, while upon the screw-threaded portion of the rod 7 is located a nut 9. Located upon one end of the cable 5, adjacent the upper end of the rod 7, is a stop 5ª.

Fixed to the face of the base 1, adjacent the right-hand side thereof, are the ends of a vertically-arranged rod 10, upon which is adjustably held a collar 11, provided with an integral horizontal arm 12, through which passes a set-screw 13, and loosely arranged upon the rod 10 above said collar 11 is a collar 14, with the lower end of which is formed integral a laterally-projecting plate 15, through which is formed a suitable aperture, and upon said plate 15 is located a weight 16, provided in its under side with a recess 17 and in its top with an aperture 18, through which passes the end of the cable 5, to which is secured the rod 7.

Located upon the base 1 a suitable distance below the thermostat is a plate 19, with which is formed integral a forwardly-projecting arm 20, with the outer end of which is formed integral a vertically-arranged valve-casing 21, the same being closed at each end and provided with four horizontally-arranged partitions 22, thus forming in said valve-casing 21 the chambers 23, 24, 25, 26, and 27. All of the partitions 22 are provided with vertically-alined apertures 27ª, and through said apertures operates a valve 28, the same being provided at its top and bottom with the disks 29 and at its center with a disk 30. The portion of this valve 28 between said disks is cut away, as indicated by 31. Formed integral with the side of the valve-casing 21 and with the plate 19 is a bracket 32, in the outer end of which is formed a vertically-arranged screw-threaded aperture in which operates a screw-threaded post 33, and formed integral with said post, above the bracket 32, is a disk 34, there being a pin 35 seated in the upper end of said post. Fulcrumed upon this pin 35 is an arm 36, one end of which is connected by a rod 37 to the valve 28, said rod 37 passing through a stuffing-box arranged in the top of the valve-casing 21. Upon the opposite end of this arm 36 is adjustably located a weight 39, which counterbalances the weight of the valve 31. Passing through the arm 36 at equal distances on each side of the center thereof are the screw-threaded pins 40, upon the lower ends of which are adjustably located the contact-points 41, the same occupying positions immediately above the disk 34.

Formed integral with and projecting upwardly from the center of the arm 36 is a pair of ears 41, between which is fulcrumed a tube 42, the same being closed at each end, and located within said tube is a ball 43. Carried by the cap that closes the end of the tube that is above the valve-casing 21 is a ring 44, through which passes the lower end of the rod 6, upon which are located the nuts 8.

When in operative position, one of these nuts 8 is above said ring 44, while the remaining nut is below said ring.

Located upon the front face of the base 1, above the plate 19, is a bracket 45, on which is fulcrumed a horizontally-arranged arm 46, with one end of which is formed integral a ring 47, through which projects the lower end of the screw-threaded rod 7, the nut 9, carried by said rod, being arranged beneath said ring 47. Contact-points 48 are formed on or fixed to this arm 46, and immediately above the left-hand one of said contact-points 48 is a contact-point 50. Fulcrumed to the bracket 45, above the arm 46, is a short arm 51, which carries a contact-point 52, that is normally located immediately above the right-hand one of the contact-points 48. A bell 53 is suitably located upon the base 1, and a conductor 54 leads from one of the binding-posts of said bell to the end of the arm 46. The conductor 55 from the opposite post of said bell leads to the end of the arm 51, there being a short conductor 56 leading from the conductor 55 to the contact-point 50.

The valve 57 of my improved device comprises the valve-casing 58, piston-cylinder 59, and spring-casing 60, said piston-cylinder being arranged above the valve-casing 58 and the spring-casing being located immediately above the piston-cylinder. Formed integral with the interior of the valve-casing 58 is an inwardly-projecting ring 61, in the upper end of which is formed a valve-seat 62, upon which seats the valve-disk 63. Tapped into the valve-casing 58, above and below the flange 61, are the tubular connections 64. Operating within the piston-cylinder 59 is a piston 65, the same being suitably packed, and passing through said piston 65 and carried thereby is a piston-rod 66, the lower end of which is fixed in any suitable manner to the disk valve 63. The upper end of said piston-rod 66 extends through the spring-casing 60, and within said spring-casing 60 is located a pair of spring-cups 67, in which is located an expansive coil-spring 68. Nuts 69 are located upon the upper end of the piston-rod 66 above and below the spring-cups, and a shoulder 70, on which is located a suitable cushion, is formed on the interior of the spring-casing 60 adjacent the lower end thereof. A cap 71 closes the upper end of the spring-casing 60, and a tubular connection 72 leads from said cap 71 to the chamber 24 within the valve-casing 21. Leading from the lower end of the valve-cylinder 59 is a tubular connection 73, the opposite end of which communicates with the interior of the chamber 26. Entering the central chamber 25 is a tubular connection 74, the same leading from a suitably-located fluid-compressor. (Not shown.)

Leading from the top and bottom chambers 23 and 27 are the exhaust-pipes 75, the same being united at a point below the valve-casing 21.

Assuming that the thermostat and the actuating mechanism are located in a building and that the valve which is operated by the actuating mechanism controls the inlet of steam, hot air, or hot water to the heating system that heats said building and that the temperature in said building rises above the range of temperature desired, the thermostat will operate and cause the contiguous mechanism to operate, which operation is as follows:

The movement of the thermostat transmitted to the lever 3 will cause the end thereof carrying the pulley 4 to move downwardly, and when said pulley moves downwardly the end of the cable 5 that carries the rod 6 and nuts 8 will descend, owing to the fact that the weight of said nuts 8 is greater than the weight of the small nut 9, located upon the rod 6. During this movement the rod 7 and portion of the cable 5 between said rod and the pulley 4 will remain stationary, the stop 5ᵃ normally resting in the recess 17 in the under side of the weight 16 and the ring 47 upon the end of the arm 46 resting upon the nut 9, and said arm 46 is sustained in a horizontal position. It is essential that the end of the arm 46 carrying the ring 47 be a trifle heavier than the opposite end. Consequently said ring 47 will rest upon and raise and lower with the nut 9. When the upper one of the nuts 8 is engaged upon the top side of the ring 44, carried by the right-hand end of the tube 42, which causes said ring and right-hand end to move below a horizontal line, the ball 43, which has previously been in the opposite end of said tube, will roll into the right-hand end thereof and cause said right-hand end to descend with a comparatively rapid movement, and said right-hand end will strike against the top of the right-hand one of the screw-threaded pins 40, and will thus cause the right-hand end of the fulcrumed arm 36 to descend, which movement necessarily lowers the valve 31 within the valve-casing. Thus said valve is thrown to its lowermost position, and when in such position the top disk 29 closes the passage between the chambers 23 and 24, the central disk 30 closes communication between the chambers 25 and 26, the lower disk 29 moves to the bottom of the lower chamber 27, and this movement necessarily establishes communication between the chambers 24 and 25 and the chambers 26 and 27. The fluid under pressure entering through the pipe 74 will be discharged into the chamber 25 and will pass from thence upwardly into the chamber 24 and from thence through the tubular connection 72 through the cap 71 and spring-casing 60 onto the top of the piston 65. Said piston will be forced downwardly through the piston-cylinder 59, and the valve 63 will be caused to engage upon its seat 62, thereby cutting off communication through the valve-casing, and the steam, hot water, or hot air that has been passing from one of the tubular connections 64 through said valve-casing and through the opposite tubular connection 64 will be cut off, and following this cutting off of the supply to the heating system the temperature of the building will be lowered. If for any reason the valve should fail to properly operate or should the heating-pipes be out of order and the temperature in the building should continue to rise after the operation just described has taken place, the bell 53 will be sounded, thus giving the alarm and notifying the operator or attendant that some part of the heating system is out of order and that the temperature of the room is rising above the point desired.

The alarm operation is as follows: With the excessive movement of the pulley 4 and cable 5 downwardly the upper one of the nuts 8 will engage against the upper side of the ring 49, and thus said ring will form a stop for said nut, and as said pulley and cable continue to move downwardly a portion of the cable 5, carrying the rod 7, will commence to move downwardly, and as said rod 7, carrying the nut 9, moves downwardly the right-hand end of the arm 46 will likewise move downwardly and the opposite end of said arm will be elevated and the contact-point 48, carried by the left-hand end of said arm, will contact with the point 50 and a circuit will be established through the conductor 54, the end of the arm 46, contact-point 48, contact-pin 50, conductor 56, conductor 55, and through the bell, which will therefore be sounded.

The reverse movements of the various parts of the device are apparent, and when the temperature in the building lowers the thermostat will act to elevate the pulley 4, necessarily elevating that portion of the cable 5 that carries the rod 6, and the right-hand end of the tube 42 will be elevated and the left-hand end of the arm 36 will be thereby depressed and the valve 31 will be raised and communication will be established between the chambers 23 and 24 and 25 and 26. The fluid under pressure through the pipe 74 will enter the chamber 25, pass from thence downwardly into the chamber 26, and from thence through the tubular connection 73 into the piston-cylinder below said piston. When said piston is raised by the pressure of the fluid, the valve 63 will be unseated to open communication through the valve-casing, and the fluid that has been in the piston-cylinder and spring-casing above the piston 65 will exhaust through the tubular connection 72 into the chamber 24 and from thence upwardly into the chamber 23 and from thence through the exhaust-pipe 75. If the heating-pipes or the valve be out of order when this movement takes place and should the temperature continue to lower, the excessive upward movement of the pulley 4 will bring the lower one of the nuts 8 against the under side of the ring 44, which ring would then perform the function of a stop, and then that portion of the table 5 carrying the rod 7 would commence to move upwardly, and the right-hand end of the arm 46 will be elevated by said nut 9. The contact-point 48 will engage against the contact-pin 52, thus establishing a circuit through the various connections to the bell 53, which will necessarily be sounded. Should excessive upward movement of the pulley 4 take place, the stop 5ª will elevate the weight 16 from the plate 15 and the arms 46 and 51 will be swung upon their fulcrum-points, thereby overcoming the danger of breakage of any of said parts.

An apparatus of my improved construction possesses superior advantages in point of simplicity, durability, and general efficiency and is especially valuable for large public buildings, cold-storage warehouses, &c., or any building or room where stationary temperature is desired.

By adjusting the nuts 8 upon the rod 6 the variation of range of temperature at which the device operates is obtained, and by adjusting the nut 9 upon the rod 7 the difference between the extremes of range of temperature at which the device operates and the degree at which the alarm operates is obtained. For instance, where the range is from 70° to 75° then the alarm may be set to sound at 69° and 76°.

I claim—

1. In a device of the class described, the combination with a valve controlling the heat-supply in a building, of a cylinder located above said valve, a piston operating in said cylinder, connections from said piston to said valve, a compressed-fluid-valve casing, supply and exhaust pipes leading into said casing, tubular connections from said casing to the piston-cylinder above and below said piston, a valve operating in the compressed-fluid-valve casing, a fulcrumed arm controlling the movement of said last-mentioned valve, a fulcrumed tube carried by said arm, the action of which tube imparts quick action to the fulcrumed arm, a second fulcrumed arm carrying contact-points, contact-points arranged above the first-mentioned contact-points, a bell, suitable conductors from said bell to the last-mentioned arm and to the last-mentioned contact-points, a suitable thermostat, and means operated by said thermostat that impart movement to the second-mentioned fulcrumed arm and the fulcrumed tube, substantially as specified.

2. In a device of the class described, the combination with a thermostat provided with a vertically-moving pulley, of a cable operating around said pulley, a compressed-fluid valve, suitable connections between said compressed-fluid valve and one end of the cable whereby said valve is operated, an alarm-bell, suitable connections between said bell and the remaining end of the cable, a second valve, a piston-cylinder located above said valve, a piston operating therethrough, connections from said piston to the last-mentioned valve, and tubular connections from the compressed-fluid valve to the piston-chamber, substantially as specified.

3. In a device of the class described, a thermostat, a fulcrumed bar carried by said thermostat, a pulley rotatably arranged at one end of said bar, a cable passing over said pulley, a compressed-fluid valve, a second valve, tubular connections from the compressed-fluid valve to the second valve for operating the same, actuating mechanism for the compressed-fluid valve, connections between said actuating mechanism and one end of the cable, an alarm-bell, actuating mechanism therefor that is connected with the remaining end of the cable, a stop fixed upon said last-mentioned end of the cable, and a vertically-adjustable weight around said cable above said stop, substantially as specified.

In testimony whereof I affix my signature in presence of two witnesses.

ALBERT BORDEN.

Witnesses:
M. P. SMITH,
JOHN C. HIGDON.